W. A. FAIRBURN.
SPLINT IMPREGNATING MEANS FOR MATCH MACHINES.
APPLICATION FILED MAY 1, 1915. RENEWED NOV. 24, 1917.
1,256,000.
Patented Feb. 12, 1918.
2 SHEETS—SHEET 1.
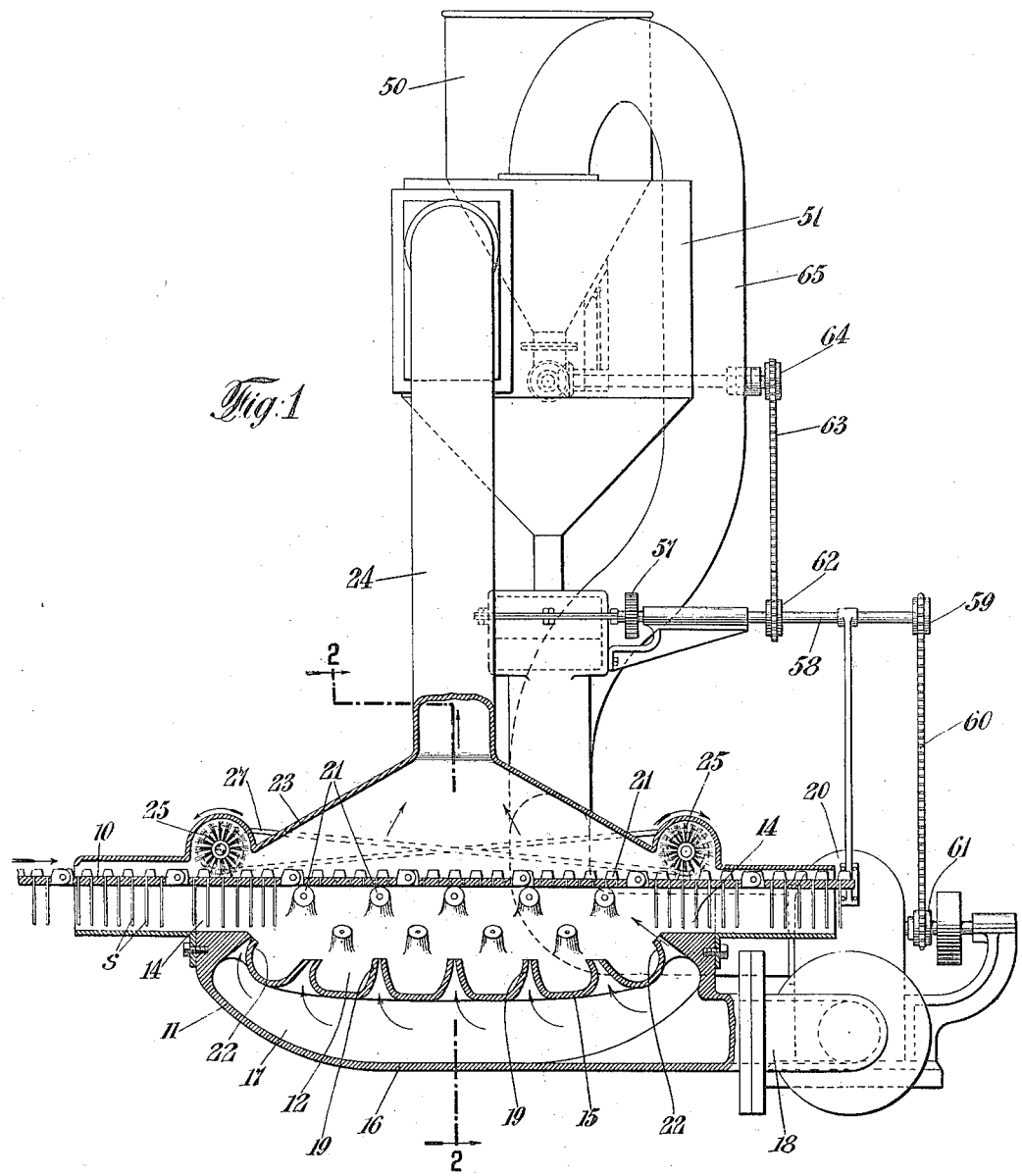
INVENTOR
William A. Fairburn
BY John F. Nolan
ATTORNEY

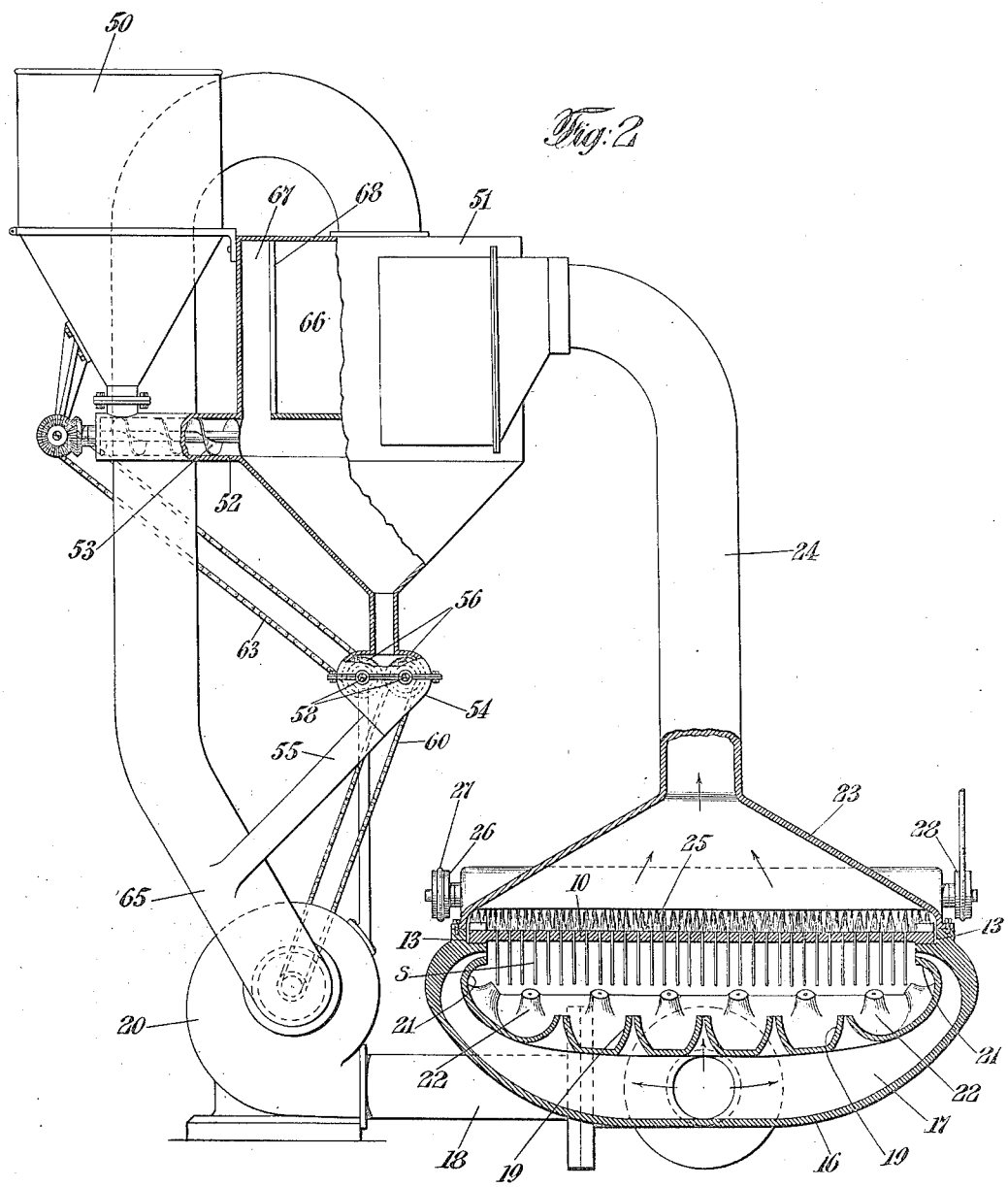

UNITED STATES PATENT OFFICE.

WILLIAM A. FAIRBURN, OF GREAT BARRINGTON, MASSACHUSETTS, ASSIGNOR TO THE DIAMOND MATCH COMPANY, OF CHICAGO, ILLINOIS, A CORPORATION OF ILLINOIS.

SPLINT-IMPREGNATING MEANS FOR MATCH-MACHINES.

1,256,000.      Specification of Letters Patent.      Patented Feb. 12, 1918.

Application filed May 1, 1915, Serial No. 25,122. Renewed November 24, 1917. Serial No. 203,365.

*To all whom it may concern:*

Be it known that I, WILLIAM A. FAIRBURN, a citizen of the United States, and resident of Great Barrington, in the county of Berkshire and State of Massachusetts, have invented certain new and useful Improvements in Splint-Impregnating Means for Match-Machines, of which the following is a specification.

This invention relates to means for treating match splints with powdered material adapted to impart to the splints a non-glowing property, which invention may be described as a modification of an apparatus forming the subject of an application for patent filed by me simultaneously herewith under Serial No. 25,121. Such apparatus embodies, among other features, a novel arrangement of air blast devices whereby an impregnating material, in the form of a dry powder, is forcibly blown against and among the rows of splints depending from the traveling carrier of a continuous match machine.

According to the present invention means are provided whereby the air and powder are mixed and the mixture is projected into the path of the splints, which means, together with various subsidiary devices coordinated therewith, will be hereinafter particularly described and claimed.

In the drawings—

Figure 1 is a longitudinal vertical section, partly in elevation, of an apparatus embodying my invention, a fragment of the carrier, partially supplied with splints, being indicated.

Fig. 2 is a sectional elevation of the apparatus, as on the line 2—2 of Fig. 1; certain parts being broken away to show internal features.

Referring to the drawings, 10 designates a part of a splint carrier comprising a series of perforated plates hinged or linked together to form an endless chain, into which plates the match splints (S) are inserted row by row and thereby transported through the match making path. Suitably-located beneath the route of the carrier after it leaves the splint inserting station is a chambered structure 11 into which project the depending splints during their travel across the structure. This structure is preferably bowl-shaped, its interior affording a relatively capacious chamber 12 within which the splints are treated with an anti-glowing material, such, for example, as powdered ammonium phosphate. The upwardly extending sides of the structure are provided with guideways 13 for the longitudinal edges of the carrier; and the ends of the structure are open, as at 14, to permit the free passage of the splints into, through and from the chamber 12. The structure embodies spaced double walls 15, 16 to afford a jacket or supplementary chamber 17 into which leads a supply pipe 18. The inner wall 15 is provided with a plurality of orifices which terminate in upwardly projecting nozzles 19 that are directed toward the path of the splints through the structure. The pipe 18 is connected with the discharge nozzle of a blower 20, or the like, by means of which powdered material from a suitable source of supply is introduced into the chamber under high pressure; being thence distributed among the nozzles and projected thereby to and among the splints within the chamber 12. A series of horizontally projecting nozzles 21 are arranged along each of the inner sides of the structure so as to direct the impregnating material horizontally in opposite directions toward and among the upper portions of the splints; and a series of nozzles 22 are arranged across each end of the structure so as to direct the material inwardly and upwardly toward the splints, and at the same time serve as a simple and efficient means to prevent the escape of the powder by way of the open inlet and outlet portions of the structure. The remaining nozzles are arranged to deliver the material in upwardly converging paths, thus insuring a thorough distribution of the material among the splints.

By forcibly blowing the air and powder at various angles against and throughout the length of the splints the powder is well incorporated with the surface of the wood in a manner to secure uniform and efficient "impregnation".

Arranged above the impregnating structure, in close relation to the upper surface of the splint chain, is a hood 23 from which leads an exhaust pipe 24 by means of which the powder escaping through the holes (which may be unfilled with splints) and spaces of the chain plates, is carried off. Rotary brushes 25, mounted at the ends of the hood, contact with the upper surface of the carrier, and thus serve not only to prevent the escape of powder beneath the ends of the hood, but also to clear the top of the carrier as it leaves the impregnating structure. The shafts of the brushes are provided at one end of the hood with pulleys 26 connected by a crossed belt 27, and one of the shafts is also provided at its opposite end with a pulley 28 which is belted with and driven from a suitable source of power. Thus the brushes are concurrently driven in the directions indicated by the adjacent arrows.

50 designates a supply hopper into which the material is introduced; and 51 designates an air and powder separator which is connected with the lower funnel-shaped discharge end of the hopper by means of a conduit 52. This conduit is provided with a feed device, such as a conveyer screw 53, the shaft of which has its bearing in the closed outer end of the conduit, whereby when the screw is properly rotated the contents of the hopper are progressively fed into the interior of the separator. The lower end of the latter is funnel-shaped and it discharges into a powder grinding mill 54 of any usual or approved construction. The mill herein illustrated is provided with co-acting grinding rolls 56 the shafts of which bear intermeshing gear wheels 57. The outwardly projecting end of one (58) of these shafts has fast thereon a sprocket wheel 59 which is geared by means of a chain 60 with a similar wheel 61 on the power driven shaft of the blower. The grinder shaft 58 is also provided with a sprocket wheel 62 which is connected by means of a chain 63 with a similar wheel 64 on a suitably-disposed shaft at the outer end of the conduit; the latter shaft bearing a bevel wheel in mesh with a similar wheel on the shaft of the feed screw 53. Thus the feed screw and the grinding rolls are driven concurrently, and in consequence the material is progressively transferred from the hopper to and finely reduced by the grinder. A discharge pipe 55 from the grinder leads to a pipe 65 which is connected with the intake of the blower, and hence the material as rapidly as it is ground is drawn into the blower and forcibly projected thereby into the supplementary chamber of the impregnating structure.

The pipe 65 is extended upward and connected with an outlet in the top of the separator, and the pipe 24 from the hood is extended upward and connected with a tangential inlet in the side of the separator.

The separator may be of any known or approved type which, while establishing air communication between the pipes 24, 65, operates effectually to separate the powder from the air and allow the powder thus separated to reënter the grinder. In the present instance a separator or "dust collector" of the Morse type is indicated, the same comprising a casing of appropriate form having therein a central air chamber 66 and an annular powder chamber 67, such chambers being partitioned by edge-spaced separating members 68. An air current being established at the outlet in the top of the separator by the action of the blower, the powder laden air is thereby drawn from the hood and is caused to flow tangentially into the central chamber of the separator in a whirling current which impinges against the inner faces of the separating members 66, the centrifugal action causing the heavier powder to be projected against such members and to be discharged through the spaces therebetween into the chamber 67. Such powder accumulating within the latter chamber, falls to the bottom thereof and passes to the grinder.

I claim—

1. The combination with a carrier constructed to support depending match splints in spaced relation to each other, of a double-wall structure providing two chambers, whereof one constitutes an impregnating chamber and the other a powder supply chamber therefor, said impregnating chamber having inlet and outlet portions for the passage of the carrier and being arranged directly beneath and adjacent to the path of the underside of the carrier, whereby the splints on the carrier progress to and through said impregnating chamber, the inner wall of the structure having orifices affording communication between the two chambers, and pneumatic means for forcing impregnating powder into the outer chamber, whereby a mixture of powder and air under pressure is projected through said orifices toward, against and among the depending splints on the carrier.

2. The combination with a carrier constructed to support depending match splints in spaced relation to each other, of a double-wall structure providing two chambers, whereof one constitutes an impregnating chamber and the other a powder supply chamber therefor, said impregnating chamber having inlet and outlet portions for the passage of the carrier and being arranged directly beneath and adjacent to the path of the underside of the carrier, whereby the splints on the carrier progress to and through said impregnating chamber, the inner wall of the structure having nozzled orifices affording communication between the chambers, the nozzles of such orifices projecting at different angles into the impregnating chamber and toward the path of the depending splints on the carrier, and pneumatic means for forcing impregnating powder into the powder supply chamber, whereby a mixture of powder and air under pressure is projected through said nozzles toward, against and among the depending splints on the carrier.

3. The combination with a carrier constructed to support depending match splints in spaced relation to each other, of a structure having a chamber for impregnating powder arranged directly beneath and adjacent to the path of the undersurface of the carrier, said chamber having inlet and outlet portions for the passage of the carrier, whereby the splints on the carrier progress into and through said chamber and are treated with the powder therein, the said chamber having at its respective ends air ducts inclined upwardly and inwardly toward the path of the carrier through the chamber so as to prevent the escape of the powder through the inlet and outlet portions of the structure.

4. The combination with a carrier constructed to support depending match splints in spaced relation to each other, of a structure having a chamber for impregnating powder arranged directly beneath and adjacent to the path of the underside of the carrier, said chamber having inlet and outlet portions for the passage of the carrier, whereby the splints on the carrier progress into and through said chamber, and are treated with the powder therein, said chamber having in its bottom and ends inclined nozzles directed toward the path of the depending splints within the chamber, the nozzles at the ends being inclined upwardly and inwardly toward said path, and pneumatic means for forcibly projecting impregnating powder through said nozzles into the chamber.

Signed at New York, in the county and State of New York this 30th day of April, A. D. 1915.

WILLIAM A. FAIRBURN.